United States Patent
Michelassi et al.

(10) Patent No.: US 10,218,247 B2
(45) Date of Patent: Feb. 26, 2019

(54) INTEGRATED MOTOR AND FLUID PUMP

(71) Applicant: GENERAL ELECTRIC COMPANY, Schenectady, NY (US)

(72) Inventors: Vittorio Michelassi, Munich (DE); Siddharth Navinchandra Ashar, Clifton Park, NY (US); Ismail Hakki Sezal, Munich (DE); Rene du Cauze de Nazelle, Munich (DE); Egidio Marotta, Houston, TX (US); Ravishankar Balasubramanian, Cypress, TX (US); Mohamed Osama, Munich (DE)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 14/729,405

(22) Filed: Jun. 3, 2015

(65) Prior Publication Data
US 2016/0169231 A1 Jun. 16, 2016

Related U.S. Application Data

(60) Provisional application No. 62/092,307, filed on Dec. 16, 2014.

(51) Int. Cl.
*F04D 1/06* (2006.01)
*H02K 9/19* (2006.01)
(Continued)

(52) U.S. Cl.
CPC ............... *H02K 9/19* (2013.01); *F04D 1/06* (2013.01); *F04D 13/0673* (2013.01);
(Continued)

(58) Field of Classification Search
CPC ...... F04D 1/06; F04D 3/00; F04D 3/02; F04D 5/003; F04D 5/006; F04D 5/008;
(Continued)

(56) References Cited

U.S. PATENT DOCUMENTS 1,661,360 A * 3/1928 Clark ..................... F04D 3/02
366/265
2,942,555 A 6/1960 Pezzillo
(Continued)

OTHER PUBLICATIONS

"FMC Subsea Pumping—Offshore Power and Rotating Equipment", FMC Technologies, pp. 1-14, Apr. 2013, downloaded from http://www.gaselectricpartnership.com/OffshorefmcSubSeaPumps.pdf.

(Continued)

*Primary Examiner* — Bryan Lettman
*Assistant Examiner* — Charles W Nichols
(74) *Attorney, Agent, or Firm* — GE Global Patent Operation; Marc A. Vivenzio

(57) ABSTRACT

An electric pump powered by an electric motor having a stator disposed within a hollow rotor is provided. Impellers on the rotor outer surface extend into a fluid flow path defined by the pump. One or more torque-producing rotor sections are driven by a plurality of independently controllable stator sections disposed within the rotor cavity. The relative positions of the rotor and stator are maintained by a plurality of bearings configured to allow rotation of the rotor and defining a bearing span. The pump is configured such that the stator and rotor share the same bearing span. Such an arrangement reduces motor windage losses relative to conventional motors in which the rotor is disposed within the stator, owing to a reduction in the diameter of the air gap between the stator and the rotor. In addition, the peripheral speed of the pump is increased owing to an increase in the rotor diameter.

24 Claims, 12 Drawing Sheets

(51) Int. Cl.
| | |
|---|---|
| *F04D 31/00* | (2006.01) |
| *H02K 1/27* | (2006.01) |
| *F04D 29/06* | (2006.01) |
| *F04D 13/06* | (2006.01) |
| *H02K 16/00* | (2006.01) |
| *F04D 13/10* | (2006.01) |
| *H02K 7/14* | (2006.01) |
| *H02K 17/16* | (2006.01) |
| *H02K 21/22* | (2006.01) |
| *H02K 19/10* | (2006.01) |

(52) U.S. Cl.
CPC ......... *F04D 13/0693* (2013.01); *F04D 13/10* (2013.01); *F04D 29/061* (2013.01); *F04D 31/00* (2013.01); *H02K 1/2786* (2013.01); *H02K 7/14* (2013.01); *H02K 16/00* (2013.01); *H02K 17/16* (2013.01); *H02K 19/103* (2013.01); *H02K 21/22* (2013.01)

(58) Field of Classification Search
CPC ............ F04D 13/0646; F04D 13/0653; F04D 13/0673; F04D 13/086; F04D 13/10; F04D 13/12; F04D 29/061; H02K 1/2786; H02K 9/19; H02K 16/00; H02K 17/16; H02K 19/103; H02K 21/22; H02K 1/20; H02K 1/32; F01M 7/00
USPC .......................... 310/52, 54, 58, 59, 60 A, 90
See application file for complete search history.

(56) References Cited

U.S. PATENT DOCUMENTS

| | | | |
|---|---|---|---|
| 3,007,065 A | * | 10/1961 | Rigney .................... H02K 9/19 310/54 |
| 3,132,595 A | | 5/1964 | Bower |
| 3,433,163 A | * | 3/1969 | Brancart .................... F04D 3/00 417/353 |
| 4,990,068 A | | 2/1991 | Zhong et al. |
| 5,795,135 A | | 8/1998 | Nyilas et al. |
| 5,838,135 A | * | 11/1998 | Satake ................... H02K 16/00 310/112 |
| 5,927,941 A | | 7/1999 | Kato et al. |
| 5,939,813 A | | 8/1999 | Schoeb |
| 6,457,950 B1 | | 10/2002 | Cooper et al. |
| 8,777,596 B2 | | 7/2014 | Cunningham et al. |
| 2002/0113511 A1 | | 8/2002 | Daikoku et al. |
| 2009/0098003 A1 | | 4/2009 | Kothnur et al. |
| 2013/0171012 A1 | | 7/2013 | Blankemeier et al. |
| 2014/0271284 A1 | | 9/2014 | Gray et al. |
| 2016/0276970 A1 | | 9/2016 | Hawes et al. |

OTHER PUBLICATIONS

International Search Report and Written Opinion issued in connection with corresponding PCT Application No. PCT/US2015/065668 dated Mar. 9, 2016.

* cited by examiner

INTEGRATED MOTOR AND FLUID PUMP

CROSS REFERENCE TO RELATED APPLICATIONS

The present application claims priority to U.S. provisional application 62/092,307 filed Dec. 16, 2014 and which is incorporated by reference herein in its entirety.

BACKGROUND

The present invention relates to fluid pumps and the electric motors which may be used to drive them. In particular, the present invention relates to high efficiency compact fluid pumps which may be used to process a multiphase fluid.

Electric pump assemblies are used in a wide variety of industrial practices including the transport of fluids over long distances in pipelines, in wellbore applications for pumping production fluids, such as water or petroleum; and in chemical synthesis and processing applications. Electric pump assemblies used in industrial practice typically include, among other components, a pumping section that provides for the pumping of high volumes of fluid. A typical electric pump utilizes a combination of diffusers and impellers, together referred to as pump stages, for pumping fluids. During operation, the impellers are configured to rotate adjacent to fixed diffusers. Typically, the pumping section is coupled to an electric motor which provides mechanical energy to the pumping section by means of a rotary shaft coupled to the motor. A typical electric motor configured to drive the pumping section comprises an outer stator disposed around a torque-producing complement of an inner rotor. This necessarily limits both the size of the rotor and options for its mechanical coupling to the pumping section.

There remains a need to increase the utility of electric pump assemblies by making them more compact and more powerful. Accordingly, it is desired to provide electric pump assemblies which provide greater flexibility by being more compact and powerful relative to conventional electric pump assemblies.

BRIEF DESCRIPTION

In one embodiment, the present invention provides an electric pump comprising: (a) a hollow rotor defining a rotor inner surface, a rotor outer surface and a rotor cavity; (b) a stator comprising a plurality of independently controllable stator sections disposed within the rotor cavity; and (c) a plurality of bearings configured to allow rotation of the rotor; wherein the hollow rotor comprises (i) one or more impellers fixed to the rotor outer surface, and (ii) one or more torque-producing complements to the independently controllable stator sections.

In another embodiment, the present invention provides an electric pump comprising: (a) a hollow rotor defining a rotor inner surface, a rotor outer surface and a rotor cavity; (b) a stator comprising a plurality of independently controllable stator sections disposed within the rotor cavity; (c) a plurality of bearings configured to allow rotation of the rotor; (d) one or more diffusers extending into a fluid flow path defined by the pump; and (e) a coolant fluid recirculation system; wherein the hollow rotor comprises (i) one or more impellers fixed to the rotor outer surface and extending into the fluid flow path defined by the pump, and (ii) a plurality of torque-producing complements to the independently controllable stator sections.

In yet another embodiment, the present invention provides an electric pump comprising: (a) a hollow rotor defining a rotor inner surface, a rotor outer surface and a rotor cavity; (b) a stator comprising a plurality of independently controllable stator sections disposed within the rotor cavity; (c) a plurality of bearings configured to allow rotation of the rotor; (d) one or more diffusers extending into a fluid flow path defined by the pump; (e) a coolant fluid recirculation system; (f) a pump housing; (g) one or more fluid inlets; and (h) one or more fluid outlets; wherein the hollow rotor comprises (i) one or more impellers fixed to the rotor outer surface and extending into the fluid flow path defined by the pump, and (ii) a plurality of torque-producing complements to the independently controllable stator sections.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
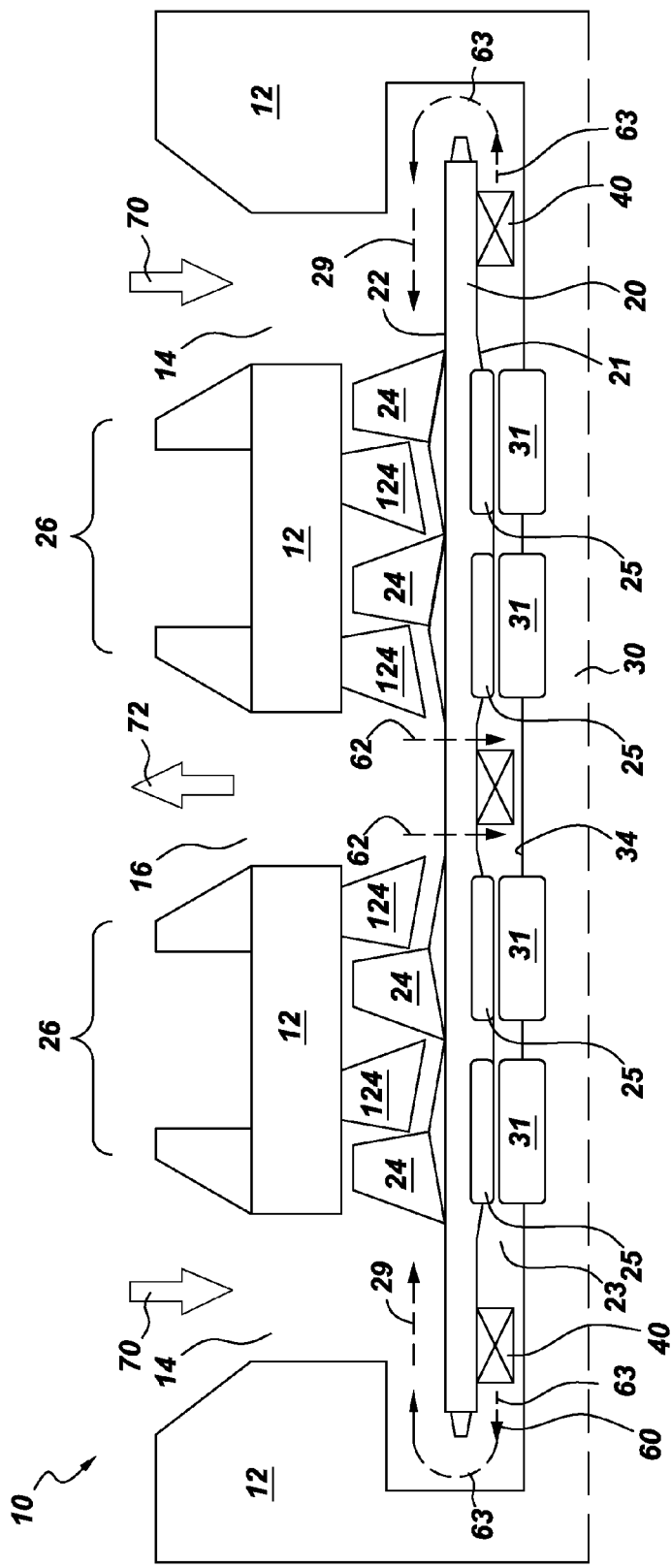
FIG. 1 illustrates an electric pump provided by the present invention.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, the present invention provides a novel electric pump in which the pumping component is powered by an electric motor having a stator disposed within a hollow rotor. In one or more embodiments, the stator and the hollow rotor are essentially coextensive and occupy the same bearing span. In an alternate set of embodiments, the stator and hollow rotor are not coextensive with respect to the bearing span. By disposing the stator within a hollow rotor the present invention solves a number of problems of long standing. First, in one or more embodiments, motor windage losses are reduced, relative to conventional motors in which the rotor is disposed within the stator, owing to a reduction in the diameter of the air gap between the stator and the rotor. Second, the peripheral speed of the pump is increased owing to an increase in the rotor diameter. Third, the pump can be made more compact since the pumping and motor sections may be integrated into essentially the same bearing span.

In one or more embodiments, a production fluid being processed by the electric pump can be used to cool the stator and lubricate bearings common to both the stator and the rotor. For example, a portion of a production fluid being processed by the pump at the outer surface of the hollow rotor may be introduced into the rotor cavity and contacted with bearings supported between the inner surface of the hollow rotor and the outer surface of the stator.

Alternatively, the novel electric pumps provided by the present invention may be equipped with one or more dedicated coolant fluid recirculation systems in which the coolant fluid does not come into contact with the production fluid.

The outer surface of the hollow rotor may be equipped with one or more impellers configured as a pump stage. Pump stages are discussed in detail with respect to FIG. 1 herein. In one or more embodiments, the one or more impellers are configured as a single pump stage. In an alternate embodiment, the one or more impellers are configured as a plurality of pump stages. In one or more embodiments, the electric pump provided by the present invention comprises a plurality of pump stages and at least two of the pump stages are arranged back to back and configured for parallel pumping of a production fluid. In an alternate set of embodiments, at least two of the pump stages are arranged back to back and configured for series pumping of a production fluid. Parallel and series pumping principles are discussed in greater detail with respect to FIGS. 1 and 5.

The electric pump provided by the present invention may in one or more embodiments comprise one or more stator sections comprising stator windings arranged in a distributed winding configuration. In an alternate set of embodiments, one or more stator sections may comprise stator windings arranged in a concentrated (tooth) winding configuration.

In one or more embodiments, the hollow rotor and the stator are configured as a squirrel cage induction motor. In a first alternate set of embodiments, the hollow rotor and the stator are configured as an interior permanent magnet motor. In a second alternate set of embodiments, the hollow rotor and the stator are configured as surface permanent magnet motor. In a third alternate set of embodiments, the hollow rotor and the stator are configured as an inset permanent magnet motor. In a fourth alternate set of embodiments, the hollow rotor and the stator are configured as a synchronous reluctance motor. In yet another alternate set of embodiments, the hollow rotor and the stator are configured as a combination of two or more of the foregoing rotor-stator configurations.

Turning now to the figures, FIG. 1 illustrates an electric pump 10 provided by the present invention shown as a cross-section of the top half of the electric pump. The electric pump comprises a housing 12, defining a pair of fluid inlets 14 and a single fluid outlet 16. The electric pump comprises a hollow rotor 20 having an inner surface 21 and an outer surface 22. Inner surface 21 defines a rotor cavity 23. Stator 30 is disposed within the rotor cavity. In the embodiment shown, the rotor is supported relative to the stator by three bearings 40 constituting a bearing span 41 (See FIG. 2). In the embodiment shown, independently controllable stator sections 31 and their torque-producing complements 25, impellers 24 and diffusers 124 are shown as falling within the same portions of the bearing span defined by bearings 40. This condition may be at times herein referred to as the motor and pump being contained within the same bearing span. In the embodiment shown, independently controllable stator sections 31 and their torque-producing rotor section counterparts 25 may be conveniently regarded as the motor, while pump stages 26 comprising impellers 24 and diffusers 124 may be regarded as the pump.

As noted, stator sections 31 are independently controllable, meaning that each stator section is independently powered and controlled. This feature allows for a high level of control over the performance characteristics of the pump by controlling power supply to individual stator sections 31 during operation. The need for less or more power to be delivered to individual stator sections may vary rapidly, as when the production fluid to be processed by the pump is a multiphase fluid comprising varying amounts of gas. For example, the gas volume fraction (GVF) of a multiphase production fluid may vary significantly over a short period of time in a hydrocarbon producing well. In one or more embodiments, stator sections are independently controlled by variable frequency drives. In one or more embodiments, stator sections may be controlled by a combination of one or more variable frequency drives together with sensorless control techniques such as are disclosed in U.S. patent application Ser. No. 14/663,691 filed Mar. 20, 2015 and which is incorporated herein by reference in its entirety.

Still referring to FIG. 1, the figure represents an electric pump 10 provided by the present invention in operation. An unprocessed production fluid 70 is introduced at each of inlets 14 and into fluid flow path 29 defined by the outer surface 22 of the hollow rotor and pump stages 26, and exits the pump as processed production fluid 72 at common outlet 16. In the embodiment shown, a portion of the production fluid is introduced into rotor cavity 23 via rotor perforations 62. Driven by the action of pump stages 26, the portion of the production fluid introduced into the rotor cavity encounters and may lubricate bearings 40 before being reintroduced into fluid flow path 29. The direction of fluid flow through the rotor cavity is indicated by numbered elements 63. Those of ordinary skill in the art will appreciate that the production fluid is shown as being processed in two parallel pump stages before being combined at outlet 16. Pump stages 26 are arranged back to back along the outer surface of the rotor in the sense that the portions of each pump stage from which the processed production fluid 72 exits the pump stage are arranged opposite one another, or back to back, at pump outlet 16.

Figure 2:
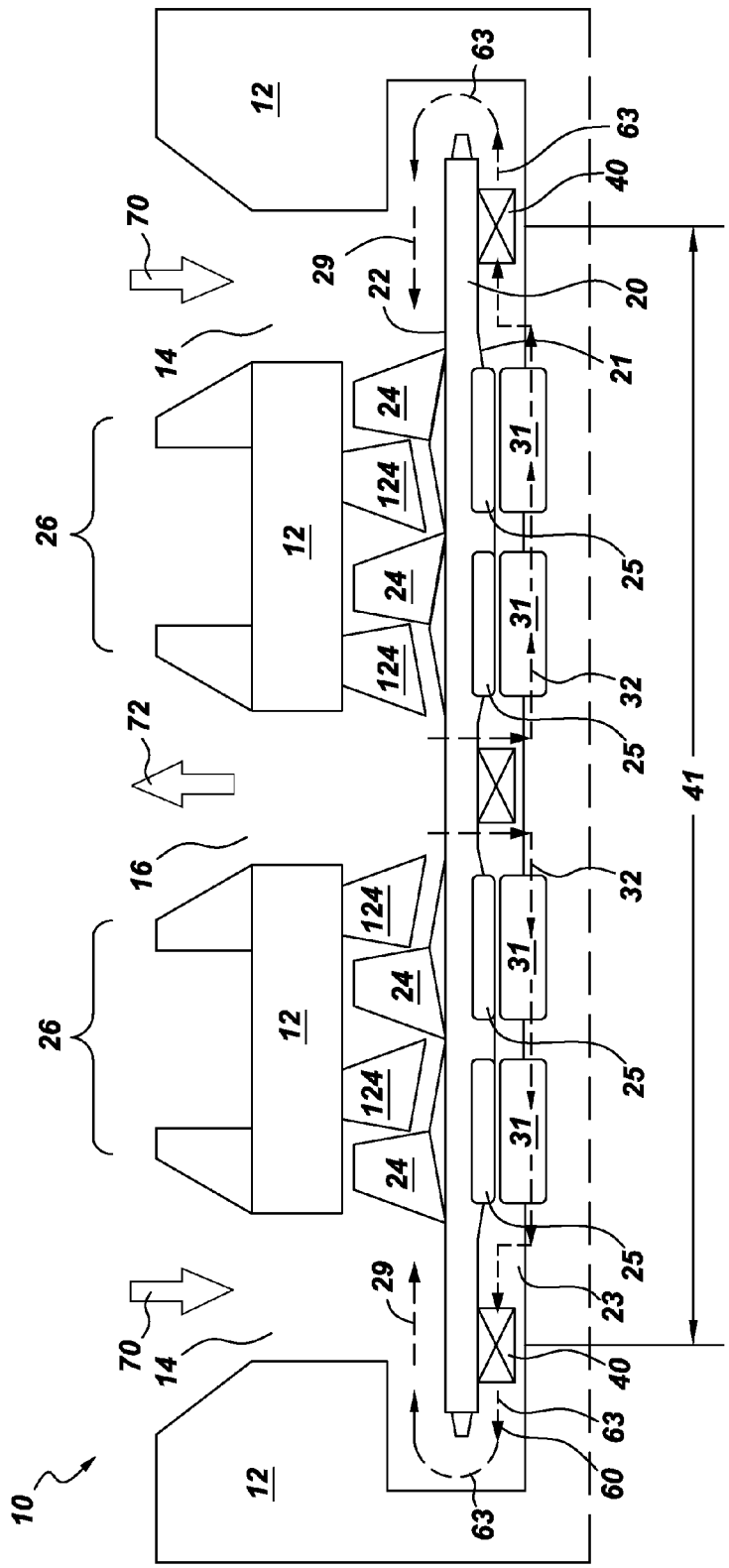
FIG. 2 illustrates an electric pump provided by the present invention.

Referring to FIG. 2, the figure illustrates an electric pump 10 provided by the present invention shown as a cross-section of the top half of the electric pump as in FIG. 1. In the embodiment shown, a portion of the production fluid is used as a coolant fluid for independently controllable stator sections 31. The pumping action of parallel, back to back pump stages 26 drives a portion of processed production fluid 72 through rotor perforations 62 and stator cooling channels 32 in directions of flow indicated by numbered elements 63. Bearings 40 are contacted by at least a portion of the production fluid emerging from the stator cooing channels 32 prior to returning to the main flow of the production fluid in fluid flow path 29. Rotor perforations 62, stator flow channels 32, the action of pump stages 26 and the portion of the production fluid circulated through the stator sections prior to being returned to fluid flow path 29 constitute an embodiment of a coolant fluid recirculation system 60 in which the production fluid serves as the coolant fluid. Such an arrangement may be most useful when the fluid being processed by the electric pump is relatively benign and relatively cool, for example when the fluid being processed by the pump is a fluid such as cold ethylene glycol.

Figure 3:
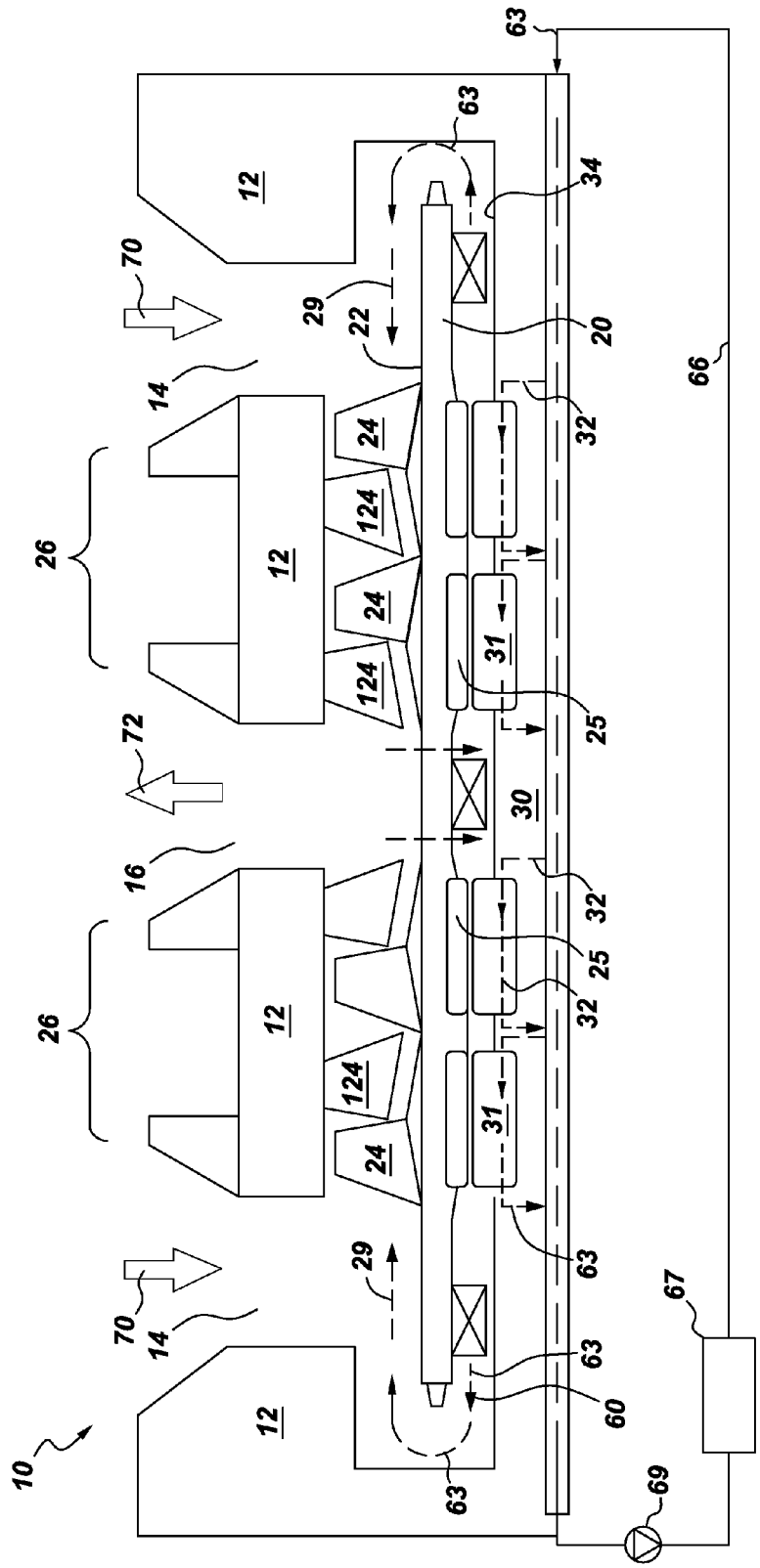
FIG. 3 illustrates an electric pump provided by the present invention.

Referring to FIG. 3, the figure illustrates an electric pump 10 provided by the present invention shown as a cross-section of the top half of the electric pump as in FIG. 1. In the embodiment shown, the electric pump is provided with a dedicated coolant fluid circuit 66 configured to cool stator sections 31. Coolant fluid circuit comprises a coolant fluid cooler 67 and fluid pump 69. Driven by pump 69, coolant fluid is introduced into stator cooling channels 32 where the coolant fluid absorbs heat from the stator section before returning to fluid cooler 67. Again, numbered elements 63 indicate the direction of flow of coolant fluid. In the embodiment shown, bearings 40 are shown as being lubricated by production fluid as in FIG. 1. This feature is optional, and as such, in one or more embodiments, bearings 40 are not lubricated by production fluid. In one or more embodiments, the bearings are lubricated by an exogenous fluid, such as the coolant fluid from a dedicated coolant fluid circuit. In another set of embodiments, bearings 40 are self-lubricating.

Figure 4:
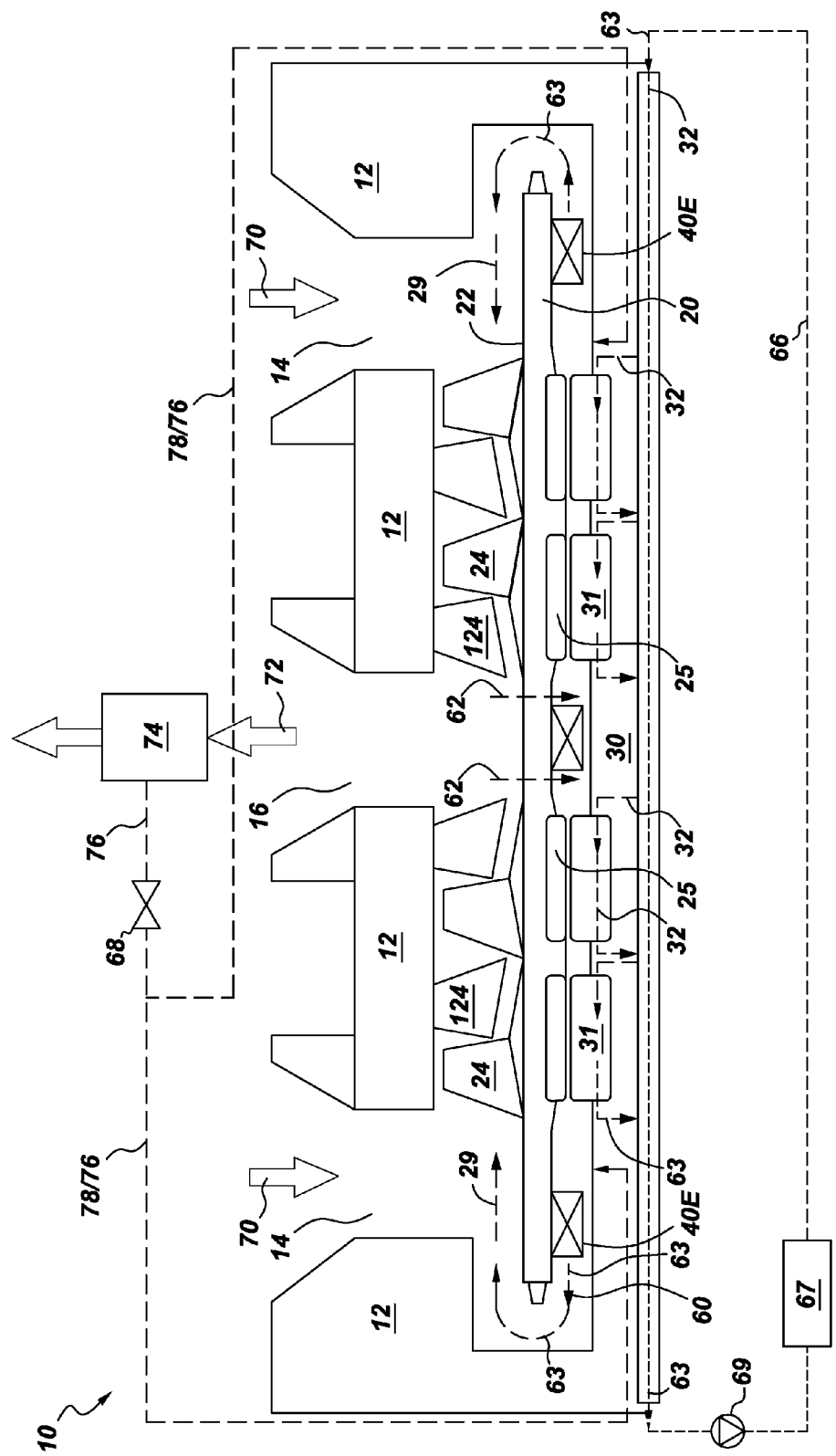
FIG. 4 illustrates an electric pump provided by the present invention.

Referring to FIG. 4, the figure represents an electric pump 10 configured as in FIG. 3 and further comprising a separator 74 configured to receive processed production fluid 72 and to separate from it a liquid-only fraction 76. This liquid-only fraction may be used to lubricate and/or cool bearings 40. In the embodiment shown, the pump is configured to lubricate bearings 40E representing the two ends of the bearing span using liquid only fraction 76. The separator 74 may be equipped with a pump (not shown) to circulate the liquid-only fraction 76 through conduits 78 and into contact with end bearings 40E. The action of pump stages 26 causes the liquid-only fraction 76 to flow in the direction indicated by numbered elements 63 and subsequently enter pump flow path 29. The flow of the liquid-only fraction 76 to end bearings 40E may be regulated by pressure drop control valve 68. Perforations 62 allow a portion of the fluid being processed by the pump to enter the rotor cavity and contact all of the bearings present. In certain applications, the production fluid entering the electric pump is hot, for example a production fluid from a deep hydrocarbon producing well. Where the pump is located in a cold environment, for example on the sea floor, both the cooler 67 and separator 74 may rely on the cold ambient environment to serve as a heat sink for heat contained in the production fluid and heat generated in the bearings, in the stator sections 31, and in torque-producing complements 25. In an alternate embodiment related to that illustrated in FIG. 4, separator 75 is located upstream of pump inlets 14 and feeds the pump with a liquid only fraction 76 derived from a multiphase production fluid, in addition to circulating a portion of liquid only fraction 76 through bearings 40E.

Figure 5:
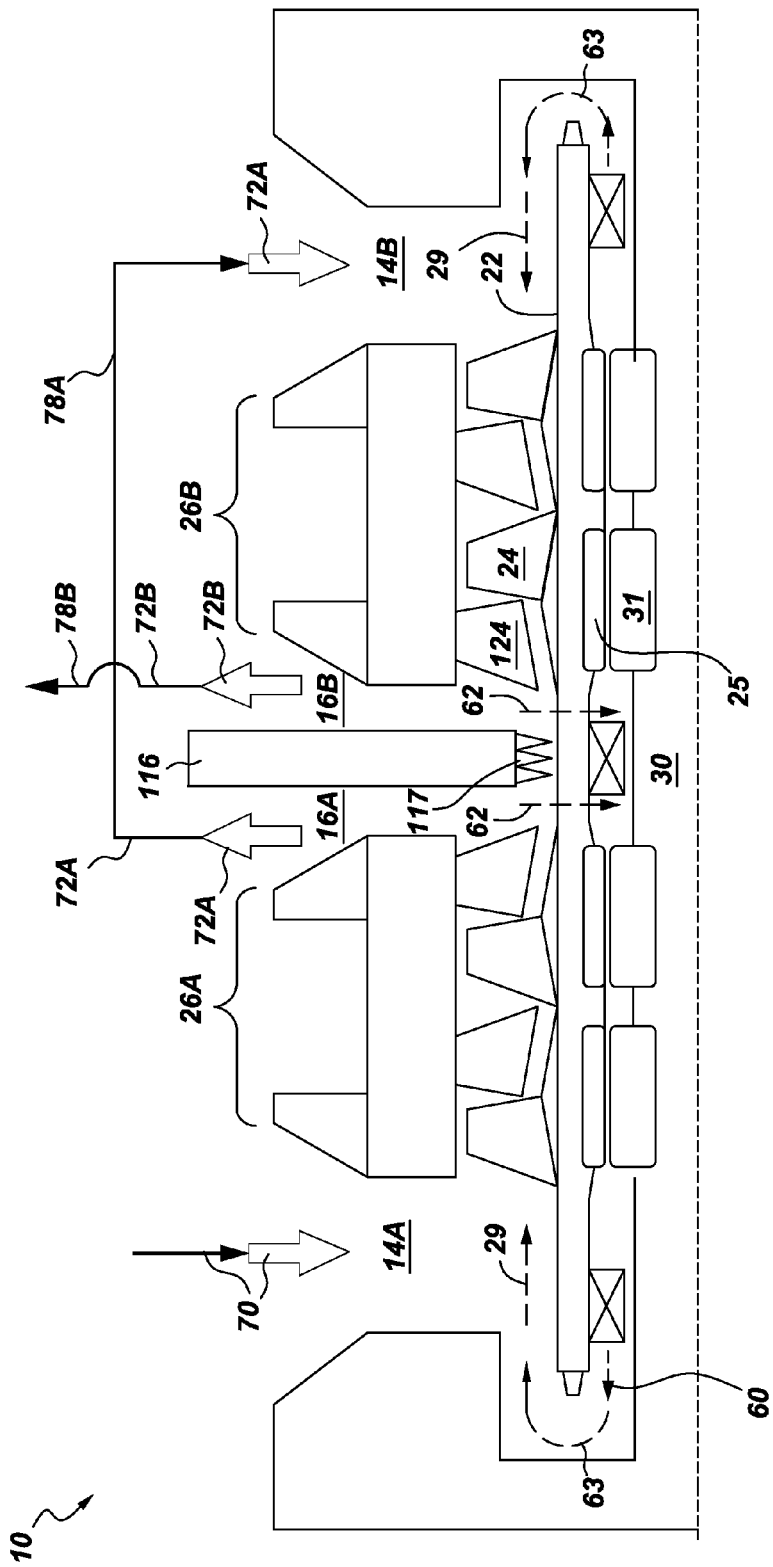
FIG. 5 illustrates an electric pump provided by the present invention.

Referring to FIG. 5, the figure represents an electric pump 10 provided by the present invention in which the pump stages 26 act in series. Thus, unprocessed fluid 70 enters the electric pump at inlet 14A and is impelled through first pump stage 26A and emerges at outlet chamber 16A as processed fluid 72A. Processed fluid 72A is then driven by the action of the pump stages through conduit 78A and enters the second pump stage 26B at inlet 14B. Processed fluid 72A is impelled through pump stage 26B and emerges at outlet chamber 16B as further processed fluid 72B which is conducted further downstream by conduit 78B. In the embodiment shown, outlet chambers 16A and 16B are separated by dividing wall 116 comprising seal 117 at its base. Seal 117 allows free rotation of the hollow rotor while inhibiting processed fluid 72A from passing from outlet chamber 16A to the adjacent outlet chamber 16B without first passing through pump stage 26B. Similarly, seal 117 inhibits further processed fluid 72B in outlet chamber 16B from entering outlet chamber 16A. In one or more embodiments, such inhibition enhances the efficiency of the electric pump. In one or more embodiments, seal 117 is a brush seal comprising metallic seal bristles. In an alternate set of embodiments, seal 117 is a brush seal comprising seal bristles comprising an organic polymer. In one such embodiment, the seal bristles comprise the engineering plastic, PEEK.

Figure 6:
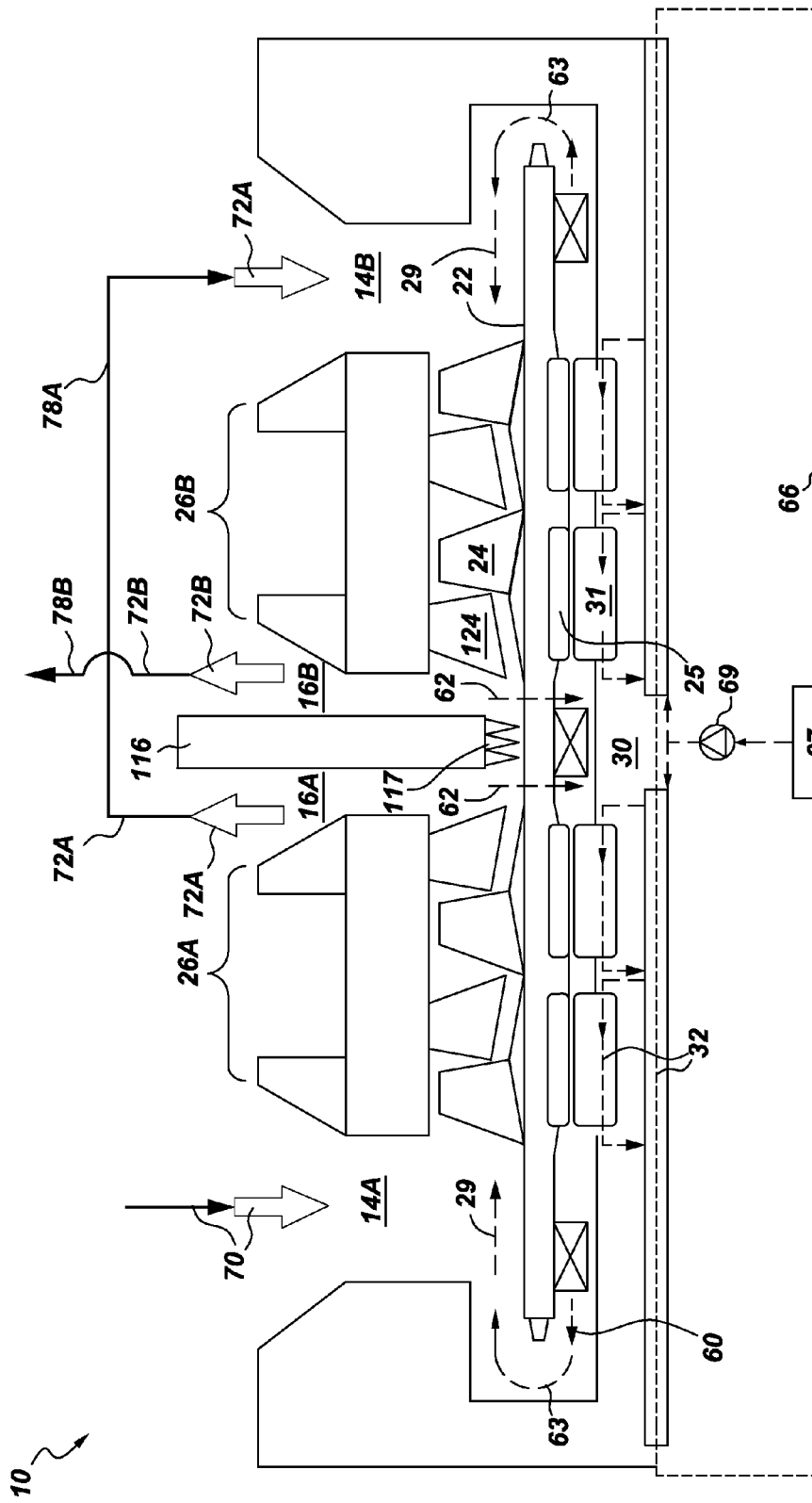
FIG. 6 illustrates an electric pump provided by the present invention.

Referring to FIG. 6, the figure represents an electric pump configured as in FIG. 5 for "in series" processing of a production fluid 70, but further comprising a dedicated coolant fluid circuit 66. In the embodiment shown, the dedicated coolant fluid circuit 66 constitutes an additional coolant fluid recirculation system, which supplements coolant fluid recirculation system 60. Coolant fluid recirculation system 60 causes a portion of the production fluid being processed by the pump to contact all three bearings 40 disposed within rotor cavity 23, thereby cooling and lubricating them.

Figure 7:
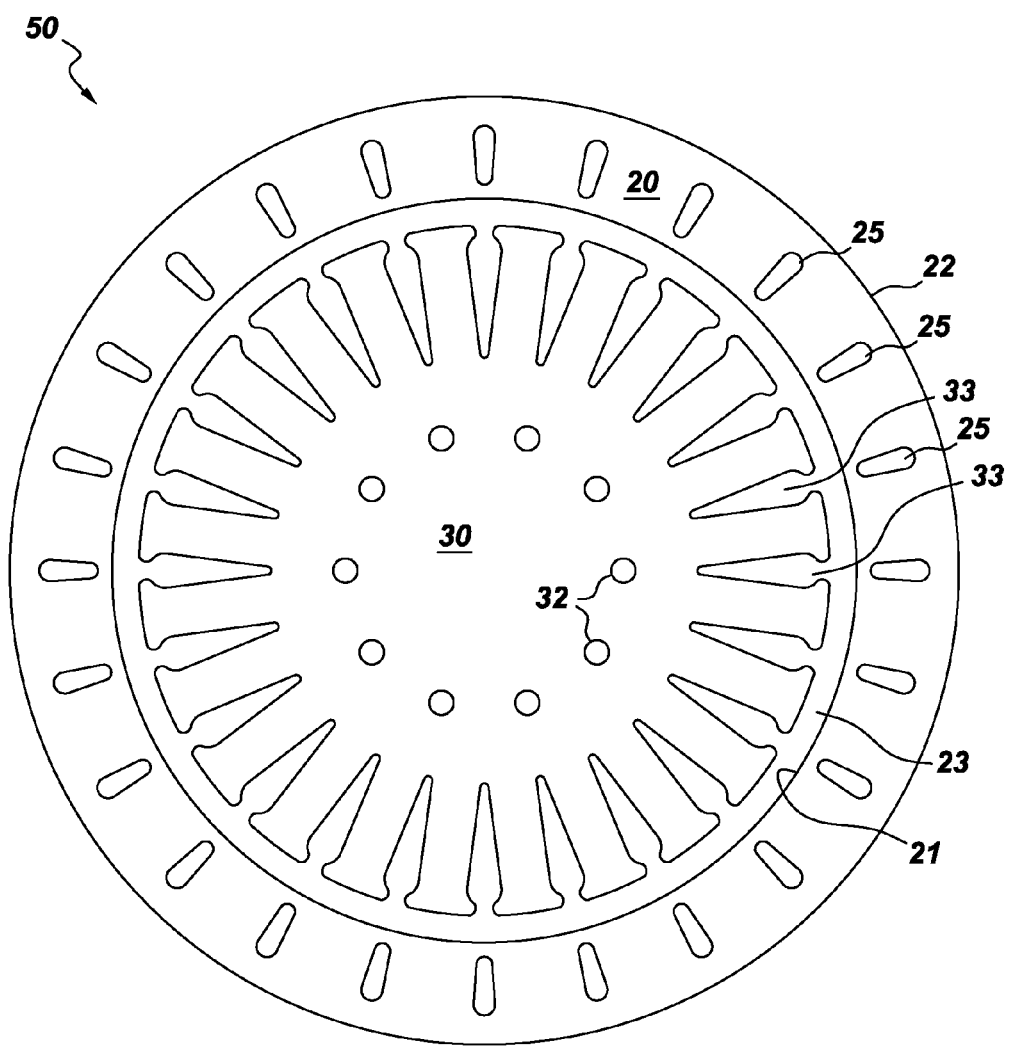
FIG. 7 illustrates a motor rotor-stator subassembly provided by the present invention.

Referring to FIG. 7, the figure represents a hollow rotor—stator subassembly 50 provided by the present invention. Subassembly 50 may at times herein be referred to as an electric motor, or simply a motor. Motor 50 is suitable for use in one or more embodiments of an electric pump 10 provided by the present invention, and as configured, constitutes a squirrel cage induction motor. In the embodiment shown, motor 50 comprises a hollow rotor 20 defining an inner cavity 23 and a stator 30 disposed within rotor cavity 23. The motor is shown in cross-section and illustrates a portion of a single independently controllable stator section 31 (See FIGS. 1-6) and a corresponding torque-producing complement 25. Stator slots 33 are configured to accommodate the stator windings (not shown) in a distributed winding configuration. Stator 30 and hollow rotor 20 are supported relative to one another by bearings 40 (not shown) which contact an inner surface 21 of the hollow rotor and a suitable outer surface 34 (See FIG. 1) of the stator. As will be appreciated by those of ordinary skill in the art, bearings 40

(See FIGS. 1-6) allow the hollow rotor to rotate relative to the fixed stator. In the embodiment shown in FIG. 7, the torque-producing rotor sections 25 may be in the form of conductive rotor bars disposed within the body of the hollow rotor 20. In one or more embodiments, such rotor bars comprise a conductive metallic material such as aluminum or copper. The outer surface 22 of rotor 20 is configured to be joined to one or more impellers which may, for example be joined to the rotor outer surface in one or more shrink fitting steps in which an impeller is inserted into one or more appropriately sized and spaced grooves of a hot outer surface. In one or more embodiments, the impellers may be welded to the outer surface of the hollow rotor. In the embodiment shown, the stator defines a plurality of stator cooling channels 32 through which a coolant fluid may be passed in order to maintain the motor within an acceptable temperature range.

Figure 8:
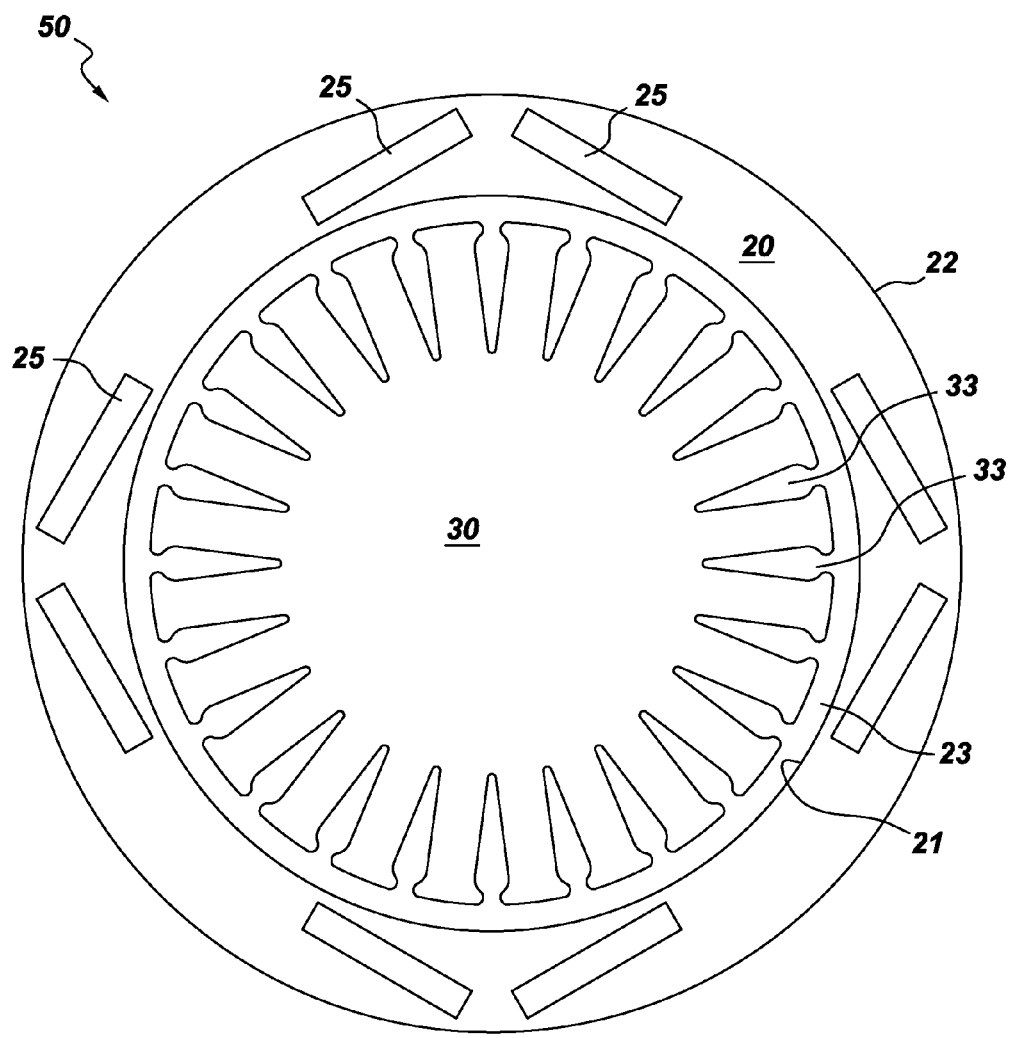
FIG. 8 illustrates a motor rotor-stator subassembly provided by the present invention.

Referring to FIG. 8, the figure represents a hollow rotor—stator subassembly 50 provided by the present invention configured as an interior permanent magnet motor. The subassembly is configured essentially as in FIG. 7 with the exception that the torque-producing complements 25 to stator sections 31 are permanent magnets disposed within the body of the hollow rotor 20. The subassembly shown in FIG. 8 (and any of FIGS. 9-12) may be advantageously equipped with stator cooling channels 32 (See for example FIG. 7) configured to be fluidly coupled to a coolant fluid recirculation system 60, for example a dedicated coolant fluid circuit 66 such as that featured in FIG. 6. The stator 30 comprises stator slots 33 configured to accommodate the stator windings (not shown) in a distributed winding configuration.

Figure 9:
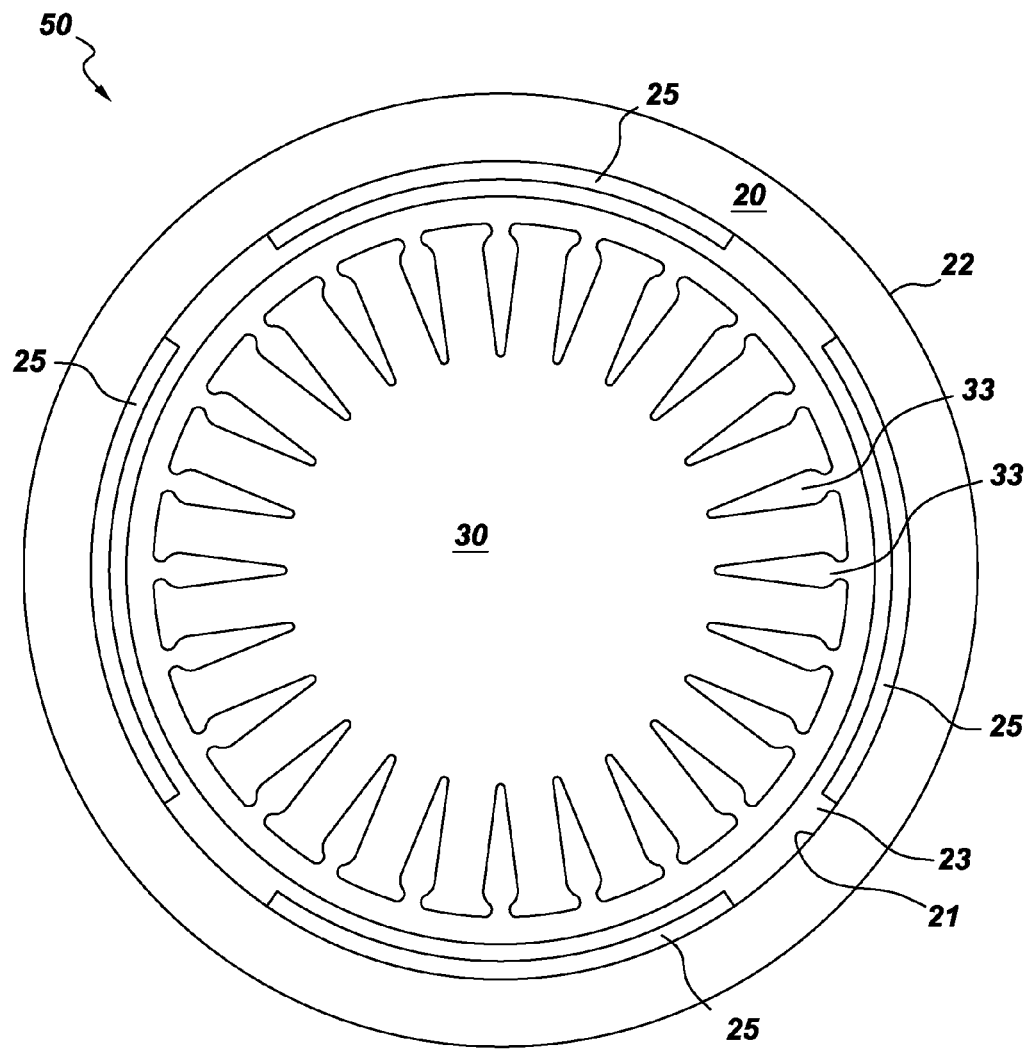
FIG. 9 illustrates a motor rotor-stator subassembly provided by the present invention.

Referring to FIG. 9, the figure represents a hollow rotor—stator subassembly 50 provided by the present invention configured as a surface permanent magnet motor. In the embodiment shown, permanent magnets indicated as torque-producing complements 25 are attached to the inner surface 21 of the hollow rotor 20 and project into rotor cavity 23. The surface permanent magnets may be attached to the inner surface 21 by techniques known to those of ordinary skill in the art, such as welding and/or shrink fitting. The stator 30 comprises stator slots 33 configured to accommodate the stator windings (not shown) in a distributed winding configuration.

Figure 10:
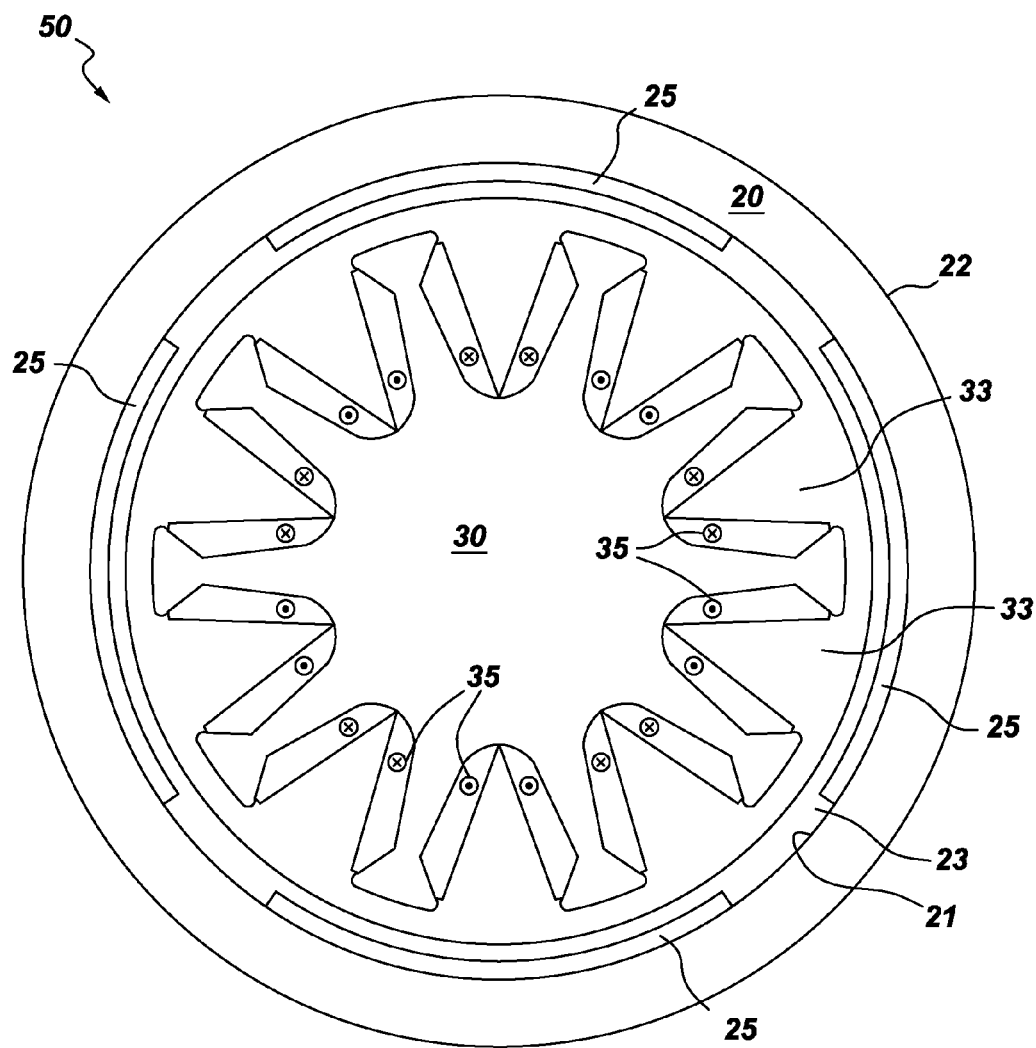
FIG. 10 illustrates a motor rotor-stator subassembly provided by the present invention.

Referring to FIG. 10, the figure represents a hollow rotor—stator subassembly 50 provided by the present invention configured as a surface permanent magnet motor as in FIG. 9, with the exception that the stator 30 comprises stator slots 33 configured to accommodate the stator windings 35 in a concentrated (tooth) winding configuration.

Figure 11:
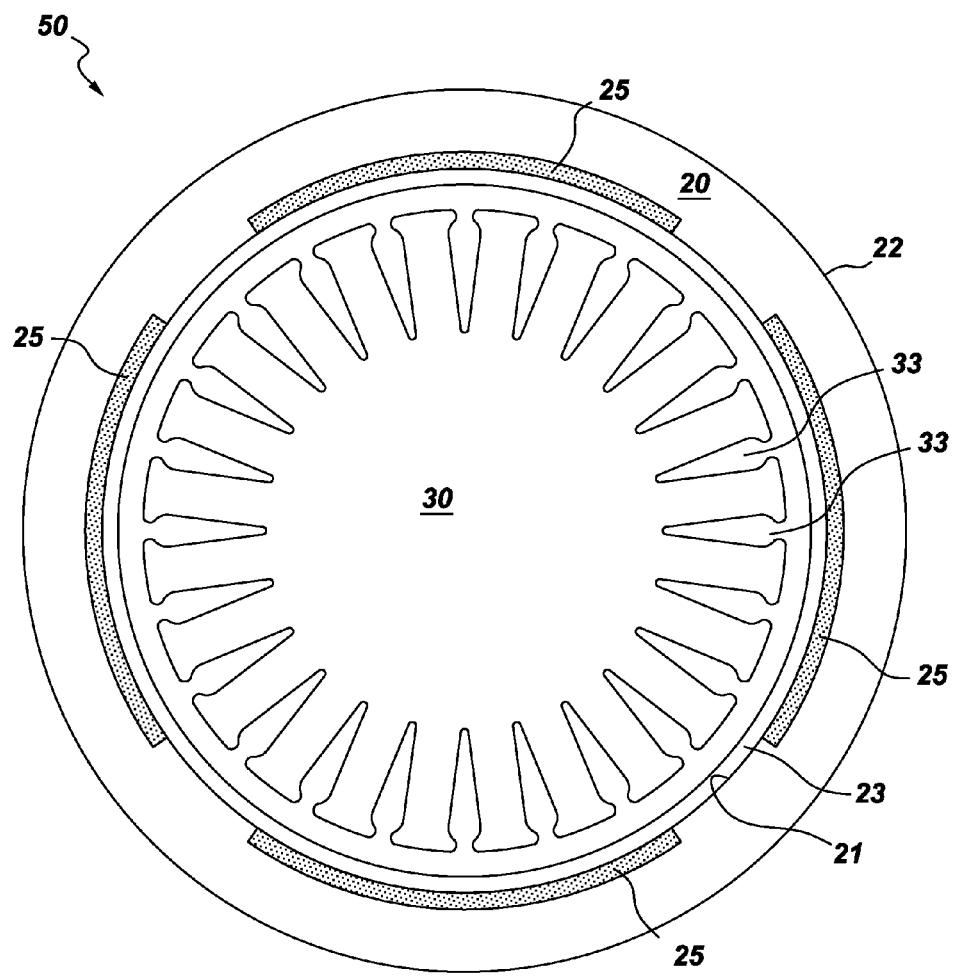
FIG. 11 illustrates a motor rotor-stator subassembly provided by the present invention.

Referring to FIG. 11, the figure represents a hollow rotor—stator subassembly 50 provided by the present invention configured as an inset permanent magnet motor.

In the embodiment shown, permanent magnets indicated as torque-producing complements 25 to independently controllable stator sections 31 (not shown) are accommodated by grooves on the inner surface 21 of the hollow rotor 20 and do not project into rotor cavity 23. The permanent magnets may be attached to the hollow rotor by techniques known to those of ordinary skill in the art, such as welding and/or shrink fitting. The stator 30 comprises stator slots 33 configured to accommodate the stator windings (not shown) in a distributed winding configuration.

Figure 12:
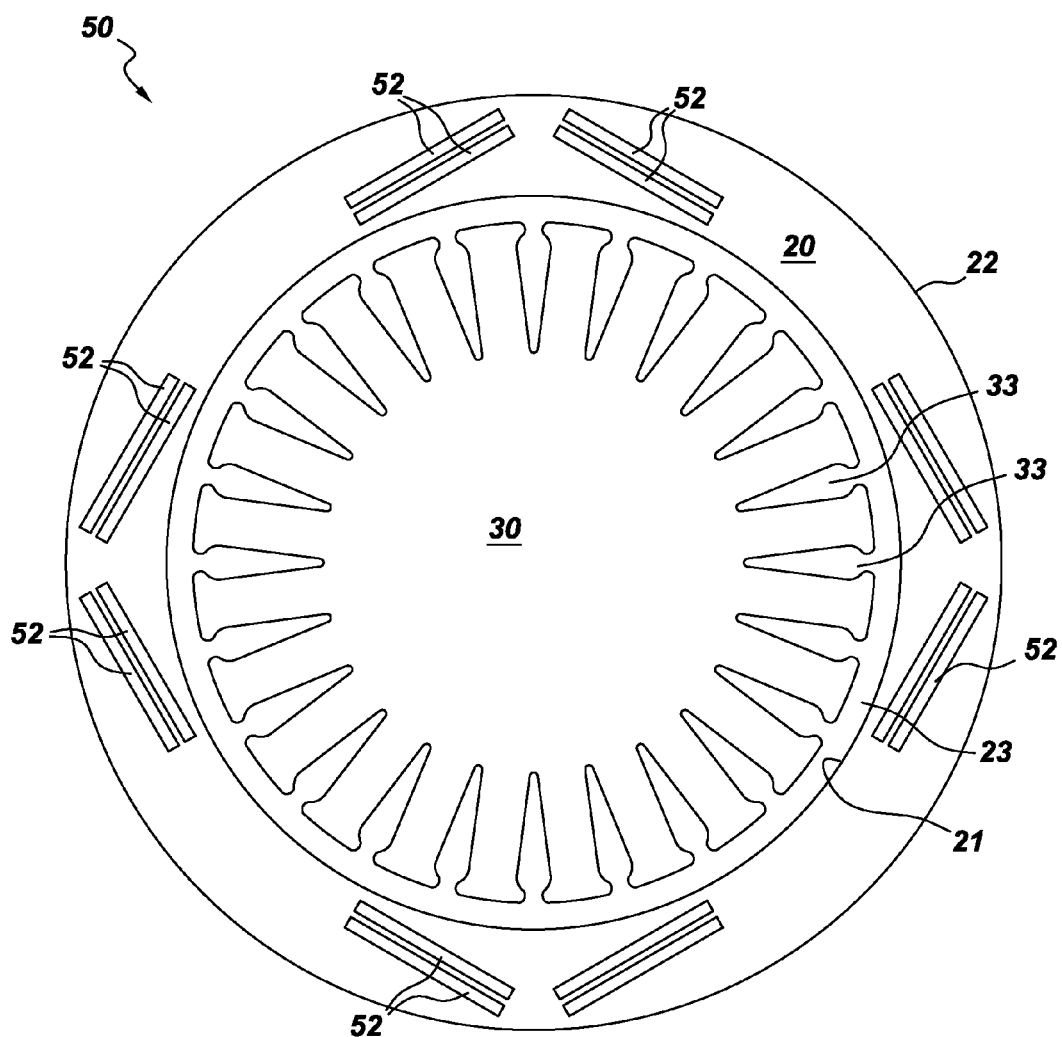
FIG. 12 illustrates a motor rotor-stator subassembly provided by the present invention.

Referring to FIG. 12, the figure represents a hollow rotor—stator subassembly 50 provided by the present invention configured as a synchronous reluctance motor. In the embodiment shown, the body of the hollow rotor comprises a torque-producing complement 25, which may be, for example, a ferromagnetic material such as iron, nickel, cobalt, and aluminum-nickel-cobalt alloys such as alnico. In one or more embodiments, the hollow rotor is comprised of a ferromagnetic material and contains a single torque-producing complement 25 along its entire length. Air slots 52 within the hollow rotor body provide for magnetic reluctance. The stator 30 comprises stator slots 33 configured to accommodate the stator windings (not shown) in a distributed winding configuration. Stator sections 31 may be controlled by microcontrollers.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. An electric pump comprising:
    (a) a hollow rotor defining a rotor inner surface, a rotor outer surface and a rotor cavity;
    (b) a stator comprising a plurality of independently controllable stator sections disposed within the rotor cavity;
    (c) a plurality of bearings configured to allow rotation of the hollow rotor;
    (d) a fluid recirculation system comprising a production fluid circuit, wherein the production fluid circuit comprises:
        a plurality of perforations disposed on a portion of the hollow rotor and located proximate to one or more fluid outlets; the plurality of perforations extending in a radial direction into the hollow rotor; and
        a lubrication flow path extending from the plurality of perforations to a fluid flow path defined by the electric pump via the plurality of bearings,
    wherein the hollow rotor comprises (i) one or more impellers fixed to the rotor outer surface, and (ii) one or more torque-producing complements to the plurality of independently controllable stator sections.

2. The electric pump according to claim 1, wherein the stator and the hollow rotor are configured as a squirrel cage induction motor.

3. The electric pump according to claim 1, wherein the stator and the hollow rotor are configured as an interior permanent magnet motor.

4. The electric pump according to claim 3, wherein the stator and the hollow rotor are configured as a surface permanent magnet motor.

5. The electric pump according to claim 3, wherein the stator and the hollow rotor are configured as an inset permanent magnet motor.

6. The electric pump according to claim 1, wherein the stator and the hollow rotor are configured as a synchronous reluctance motor.

7. The electric pump according to claim 1, wherein the one or more impellers are configured as a single pump stage.

8. The electric pump according to claim 1, wherein the one or more impellers are configured as a plurality of pump stages.

9. The electric pump according to claim 8, wherein at least two of the pump stages are arranged back to back and configured for parallel pumping of a production fluid.

10. The electric pump according to claim 8, wherein at least two of the pump stages are arranged back to back and configured for series pumping of a production fluid.

11. The electric pump according to claim 1, wherein one or more of the independently controllable stator sections comprise stator windings arranged in a distributed winding configuration.

12. The electric pump according to claim 1, wherein one or more of the independently controllable stator sections comprise stator windings arranged in a concentrated winding configuration.

13. The electric pump of claim 1, wherein the lubrication flow path is configured to receive a portion of a production fluid from the one or more fluid outlets via the plurality of perforations and circulate the portion of the production fluid for lubricating the plurality of bearings.

14. The electric pump of claim 1, wherein the fluid recirculation system further comprises a processed production fluid circuit, and wherein the processed production fluid circuit comprises:
 a conduit;
 a separator coupled to the conduit; and
 a pressure drop control valve coupled to the conduit, wherein the conduit extends from the separator to the lubrication flow path.

15. The electric pump of claim 14, wherein the separator is configured to receive a portion of a production fluid from the one or more fluid outlets and separate a liquid-only fraction from the portion of the production fluid, wherein the conduit is configured to circulate the liquid-only fraction to the lubrication flow path for lubricating the plurality of bearings, and wherein the pressure drop control valve is configured to regulate a flow of the liquid-only fraction in the conduit.

16. The electric pump of claim 1, wherein the fluid recirculation system further comprises a coolant fluid circuit, wherein the coolant fluid circuit comprises:
 a closed-loop conduit;
 a fluid pump coupled to the closed-loop conduit; and
 a cooler coupled to the closed-loop conduit, wherein the closed-loop conduit extends from a cooler to the fluid pump via a stator cooling channel disposed within the stator.

17. The electric pump of claim 16, wherein the closed-loop conduit is configured to circulate a coolant fluid into the stator cooling channel for absorbing heat from the stator, wherein the fluid pump is configured to regulate a flow of the coolant fluid in the closed-loop conduit, and wherein the cooler is configured to cool the coolant fluid before circulating the coolant fluid into the stator cooling channel.

18. An electric pump comprising:
 (a) a hollow rotor defining a rotor inner surface, a rotor outer surface and a rotor cavity;
 (b) a stator comprising a plurality of independently controllable stator sections disposed within the rotor cavity;
 (c) a plurality of bearings configured to allow rotation of the hollow rotor;
 (d) one or more diffusers extending into a fluid flow path defined by the electric pump;
 (e) a fluid recirculation system comprising a production fluid circuit, wherein the production fluid circuit comprises:
  a plurality of perforations disposed on a portion of the hollow rotor and located proximate to one or more fluid outlets; the plurality of perforations extending in a radial direction into the hollow rotor; and
  a lubrication flow path extending from the plurality of perforations to the fluid flow path via the plurality of bearings,
 wherein the hollow rotor comprises (i) one or more impellers fixed to the rotor outer surface and extending into the fluid flow path, and (ii) a plurality of torque-producing complements to the plurality of independently controllable stator sections.

19. The electric pump according to claim 18, wherein the fluid recirculation system is configured to use ambient production fluid as a coolant.

20. The electric pump according to claim 18, wherein the fluid recirculation system comprises a dedicated fluid cooling circuit configured to cool the stator.

21. The electric pump according to claim 18, wherein the fluid recirculation system is configured to bring coolant fluid into contact with one or more of the plurality of bearings.

22. The electric pump according to claim 18, wherein the stator and hollow rotor are configured as a squirrel cage induction motor, an interior permanent magnet motor, a surface permanent magnet motor, an inset permanent magnet motor; a synchronous reluctance motor; or a combination thereof.

23. The electric pump according to claim 18, wherein the one or more impellers are configured as a plurality of pump stages.

24. An electric pump comprising:
 (a) a hollow rotor defining a rotor inner surface, a rotor outer surface and a rotor cavity;
 (b) a stator comprising a plurality of independently controllable stator sections disposed within the rotor cavity;
 (c) a plurality of bearings configured to allow rotation of the hollow rotor;
 (d) one or more diffusers extending into a fluid flow path defined by the electric pump;
 (e) a fluid recirculation system comprising a production fluid circuit, wherein the production fluid circuit comprises:
  a plurality of perforations disposed on a portion of the hollow rotor and located proximate to one or more fluid outlets; the plurality of perforations extending in a radial direction into the hollow rotor; and
  a lubrication flow path extending from the plurality of perforations to the fluid flow path via the plurality of bearings;
 (f) a pump housing; and
 (g) one or more fluid inlets,
 wherein the hollow rotor comprises (i) one or more impellers fixed to the rotor outer surface and extending into the fluid flow path, and (ii) a plurality of torque-producing complements to the plurality of independently controllable stator sections.

* * * * *